(12) United States Patent
Negishi

(10) Patent No.: US 11,192,185 B2
(45) Date of Patent: Dec. 7, 2021

(54) METHOD OF PRODUCING PRODUCT

(71) Applicant: CANON KABUSHIKI KAISHA, Tokyo (JP)

(72) Inventor: Mahito Negishi, Tachikawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 933 days.

(21) Appl. No.: 15/828,796

(22) Filed: Dec. 1, 2017

(65) Prior Publication Data

US 2018/0169760 A1 Jun. 21, 2018

(30) Foreign Application Priority Data

Dec. 16, 2016 (JP) .............................. JP2016-244809
Nov. 14, 2017 (JP) .............................. JP2017-219082

(51) Int. Cl.
| | |
|---|---|
| *B22F 7/08* | (2006.01) |
| *B22F 3/24* | (2006.01) |
| *B33Y 10/00* | (2015.01) |
| *B25J 18/00* | (2006.01) |
| *B33Y 80/00* | (2015.01) |

(Continued)

(52) U.S. Cl.
CPC .................. *B22F 7/08* (2013.01); *B22F 3/24* (2013.01); *B22F 10/20* (2021.01); *B25J 18/00* (2013.01); *B25J 19/007* (2013.01); *B33Y 10/00* (2014.12); *B33Y 50/00* (2014.12); *B33Y 50/02* (2014.12); *B33Y 80/00* (2014.12); *B22F 10/30* (2021.01);
(Continued)

(58) Field of Classification Search
CPC .. B22F 7/08; B22F 3/1055; B22F 3/24; B22F 2003/1057; B22F 2003/248; B22F 2003/1059; B33Y 50/00; B33Y 10/00; B33Y 80/00; B33Y 50/02; B25J 19/007; B25J 18/00; Y02P 10/25
See application file for complete search history.

(56) References Cited

U.S. PATENT DOCUMENTS

| | | | |
|---|---|---|---|
| 6,657,155 | B2 | 12/2003 | Abe et al. |
| 9,221,174 | B2 | 12/2015 | Negishi |
| (Continued) | | | |

FOREIGN PATENT DOCUMENTS

| | | |
|---|---|---|
| JP | 2003-001714 A | 1/2003 |
| JP | 2013-067036 A | 4/2013 |
| (Continued) | | |

OTHER PUBLICATIONS

Notice of Reasons for Refusal in Japanese Application No. 2017-219082 (dated Oct. 12, 2021).

*Primary Examiner* — Nathan L Van Sell
(74) *Attorney, Agent, or Firm* — Venable LLP

(57) ABSTRACT

A method of producing a product includes a preparation step of preparing a member that constitutes a part of the product, a fixing step of positioning and fixing the member on a plate, a mounting step of positioning and mounting the plate on which the member has been fixed on an additive manufacturing apparatus, a shaping step of forming a shaped portion adhering to the upper surface of the member, a dismounting step of dismounting the plate on which the member bearing the shaped portion formed thereon is fixed from the additive manufacturing apparatus, and a separation step of separating the member bearing the shaped portion formed thereon from the plate.

21 Claims, 17 Drawing Sheets

(51) Int. Cl.
*B33Y 50/02* (2015.01)
*B33Y 50/00* (2015.01)
*B25J 19/00* (2006.01)
*B22F 10/20* (2021.01)
*B22F 10/30* (2021.01)

(52) U.S. Cl.
CPC ......... *B22F 2003/248* (2013.01); *Y02P 10/25* (2015.11)

(56) References Cited

U.S. PATENT DOCUMENTS

| | | | |
|---|---|---|---|
| 9,764,423 B2 | 9/2017 | Hoebel et al. | |
| 9,764,462 B2 | 9/2017 | Negishi | |
| 10,501,863 B2 | 12/2019 | Otake | |
| 2011/0258847 A1 | 10/2011 | Meisho et al. | |
| 2012/0103701 A1* | 5/2012 | Cho | B23B 51/02 |
| | | | 175/428 |
| 2015/0041025 A1* | 2/2015 | Wescott | B23K 26/0622 |
| | | | 148/538 |
| 2015/0104346 A1 | 4/2015 | Nakamura et al. | |
| 2015/0367415 A1* | 12/2015 | Buller | B33Y 10/00 |
| | | | 419/53 |
| 2016/0067827 A1* | 3/2016 | Zediker | B23K 26/144 |
| | | | 219/76.12 |
| 2016/0158842 A1* | 6/2016 | Urbanski | B22F 3/1055 |
| | | | 427/264 |
| 2016/0167133 A1* | 6/2016 | Yurko | B22F 1/0062 |
| | | | 428/548 |
| 2016/0271878 A1* | 9/2016 | Nuechterlein | C04B 35/653 |
| 2016/0297069 A1 | 10/2016 | Negishi | |
| 2017/0066198 A1* | 3/2017 | Ur | B29C 64/112 |

FOREIGN PATENT DOCUMENTS

| | | |
|---|---|---|
| JP | 2014-169500 A | 9/2014 |
| JP | 2015-096646 A | 5/2015 |
| JP | 2016-044338 A | 4/2016 |
| JP | 2016-155257 A | 9/2016 |

* cited by examiner

METHOD OF PRODUCING PRODUCT

BACKGROUND OF THE INVENTION

Field of the Invention

The present invention relates to a method of producing a product by preparing a member in advance and forming a three-dimensionally shaped object directly on the prepared member.

Description of the Related Art

In recent years, so-called 3D printers, i.e. additive manufacturing, have been actively developed, and various methods have been attempted. For example, various methods such as fused deposition modeling, stereolithography using photocurable resin, and selective laser sintering are known.

Selective laser sintering is a method of forming a three-dimensionally shaped object by repetitively performing steps of layering raw material powder of, for example, nylon resin, ceramics, or metal and selectively sintering part of a powder layer by irradiating the powder layer with laser light. In recent years, selective laser sintering using metal powder as a raw material has been used as a method of producing a product for which a high mechanical strength or a good thermal conductivity is required.

For example, Japanese Patent Laid-Open No. 2015-96646 proposes a method of producing a three-dimensionally shaped metal object having gloss on the surface thereof.

However, selective laser sintering has a problem that the precision of the shape of the shaped object is lower than in a case of producing a product by machining. For example, although it is possible to achieve a dimensional precision of error of 50 µm or smaller or a surface roughness Ra of 1.6 µm or smaller by machining, this is difficult in selective laser sintering.

As disclosed in Japanese Patent Laid-Open No. 2015-96646, a method of improving surface gloss has been proposed. However, in the case where the precision of the basic shape of the three-dimensionally shaped object is insufficient, the use thereof will be limited even if the surface gloss can be improved. For example, selective laser sintering has not been suitable for producing a part including a portion requiring a high precision of shape such as a part that supports a bearing or a flange joint that requires firmness of contact.

To address this, performing adjustment of the portion requiring a high precision of shape by machining after forming the three-dimensionally shaped object by selective laser sintering can be considered.

However, a special jig or preparation is needed for performing high-precision processing on a specific portion of a member whose basic shape has been already formed. This causes problems such as increase of the cost for a processing apparatus, increase of time required for processing, and decrease of throughput. In addition, on the premise that machining is performed after three-dimensional shaping, there can be a problem that the flexibility of design of the shape of the three-dimensionally shaped object is restricted due to necessity of preventing interference with a processing tool. In addition, in the case where there is a large error in the shape of the three-dimensionally shaped object, the error may not be corrected by cutting and polishing. In the case where a portion that cannot be corrected is a portion, such as a mounting shaft or a screw hole that contributes to positioning and fixation of another product the shaped object is not usable and has to be scrapped. This lowers the yield of the production.

SUMMARY OF THE INVENTION

According to a first aspect of the present invention, a method of producing a product includes a preparation step of preparing a member that constitutes a part of the product, a fixing step of positioning and fixing the member on a plate such that the member takes a position and posture according to a shape of the product, a mounting step of positioning and mounting the plate on which the member has been fixed on an additive manufacturing apparatus such that an upper surface of the member is a starting surface of three-dimensional shaping, a shaping step of forming, by the additive manufacturing apparatus placing a shaping material on the upper surface of the member and irradiating the shaping material with laser light, a shaped portion adhering to the upper surface of the member, a dismounting step of dismounting the plate on which the member bearing the shaped portion formed thereon is fixed from the additive manufacturing apparatus, and a separation step of, after the dismounting step, separating the member bearing the shaped portion formed thereon from the plate.

According to a second aspect of the present invention, a structure includes a first member including a first surface, a second surface, and a first attachment portion provided on the second surface, a second member including a third surface, a fourth surface, and a second attachment portion provided on the fourth surface, and a shaped object comprising a first end portion and a second end portion. The first end portion is connected to the first surface by sintering, and the second end portion is connected to the third surface by sintering. The first attachment portion is attachable to a third member, and the second attachment portion is attachable to a fourth member.

Further features of the present invention will become apparent from the following description of exemplary embodiments (with reference to the attached drawings).

DESCRIPTION OF THE EMBODIMENTS

Exemplary embodiments of an additive manufacturing apparatus and a method of producing a three-dimensionally shaped object according to the present invention will be described below with reference to drawings. To be noted, although the term "sintering" sometimes refers to a phenomenon of a collective body of solid powder being heated at a temperature below a melting point thereof and thereby turning into a fine object called as a sintered body, this term is used in wider definition in the description below. That is, sintering refers to heating a collective body of solid powder and thereby establishing a unified state thereof, and includes a case of heating the collective body to a temperature above the melting point.

First Exemplary Embodiment

Product

First, examples of a product including a portion requiring to be produced with a high precision of shape will be described. As a matter of course, products that will be described below are merely examples and embodiments of the present invention are not limited thereto.

Figure 1A:
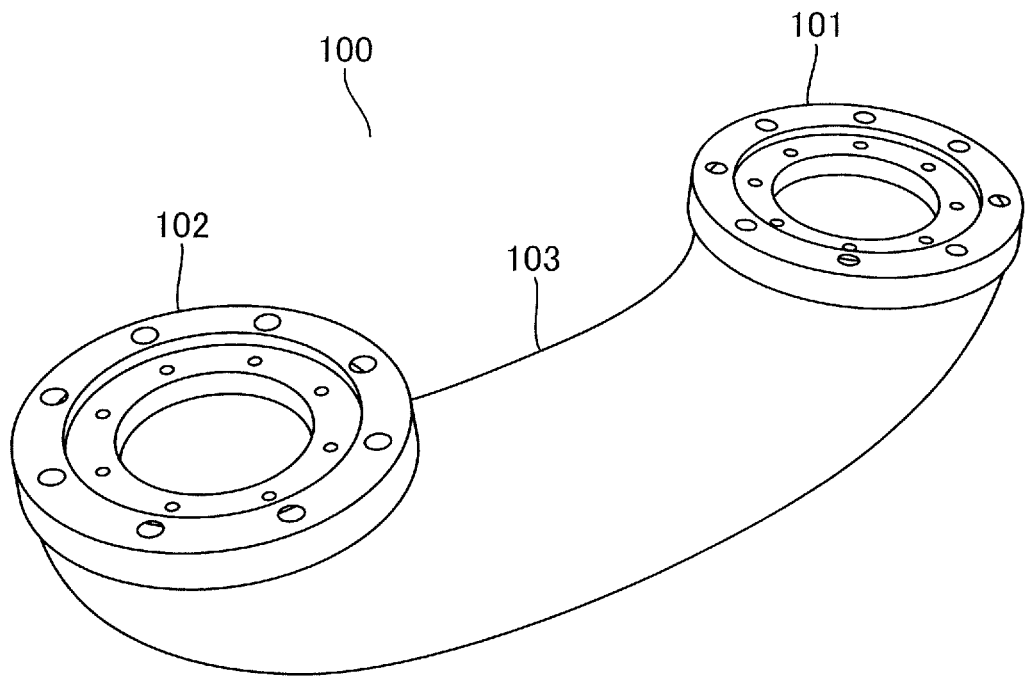
FIG. 1A is a perspective view of a product to be produced in a first exemplary embodiment.
Figure 1B:
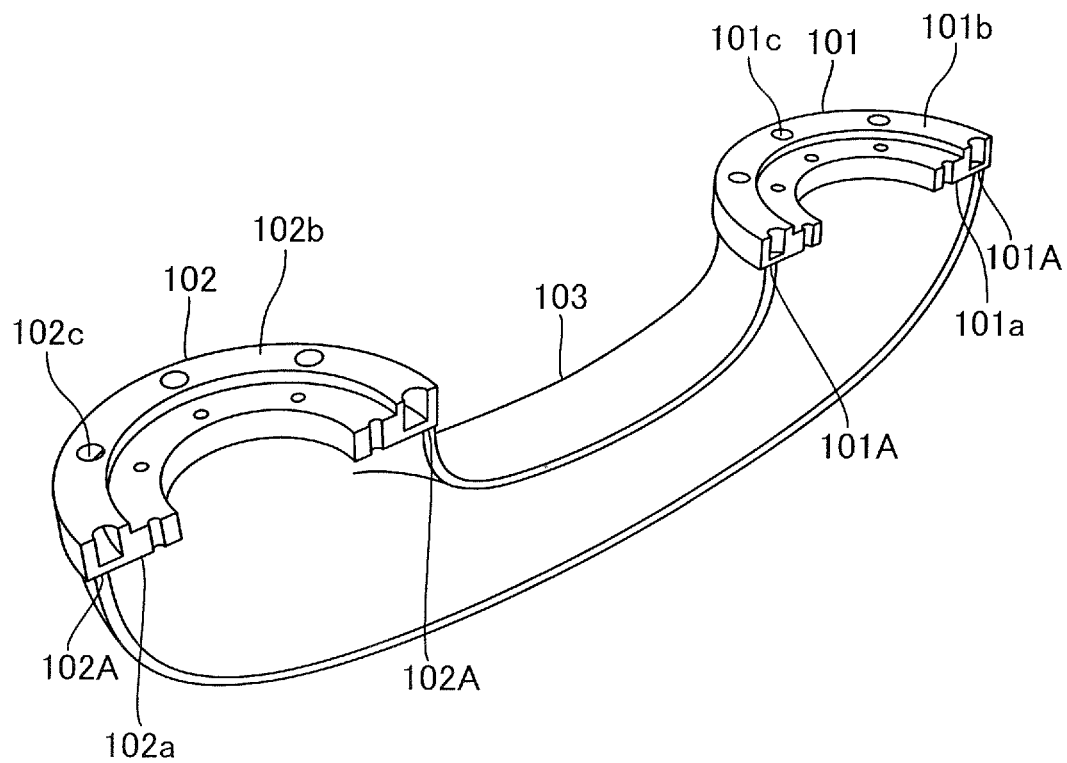
FIG. 1B of a perspective view of a partially cut model of the product.
Figure 17:
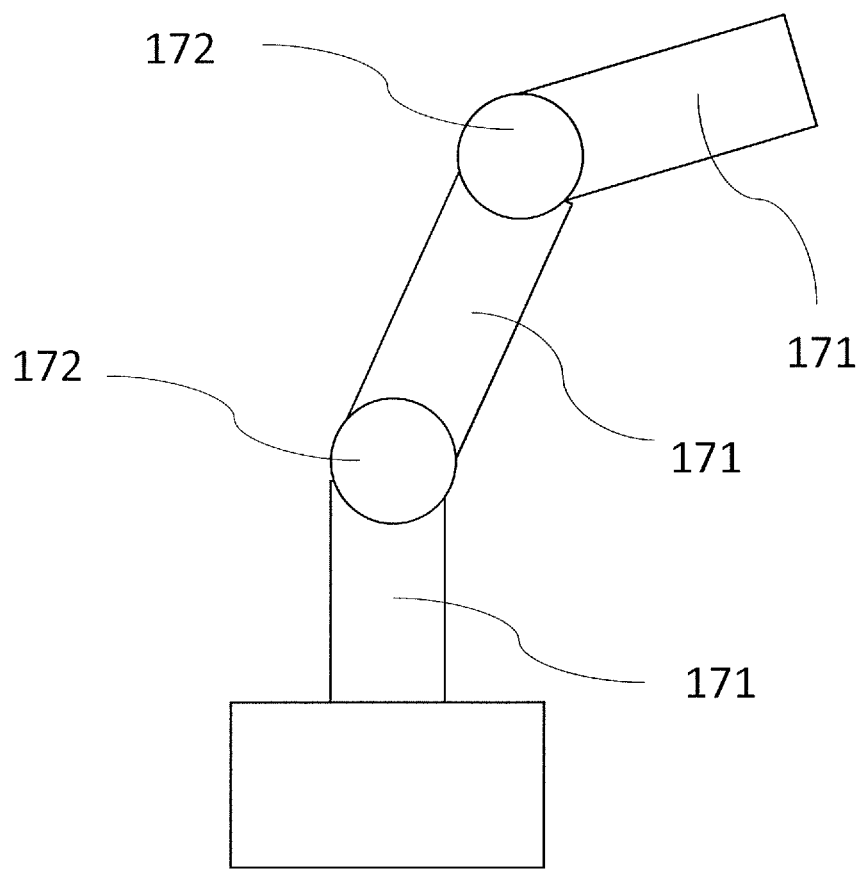
FIG. 17 illustrates a robot.

FIG. 1A is a perspective view of an example of a product to be produced. In addition, FIG. 1B is a perspective view of a partially cut model for understanding the structure of the product. A product 100 includes flange portions 101 and 102 and a shaped portion 103, and is used as, for example, a part constituting a structure of a robot. The shaped portion 103 is, for example, a tube portion that is hollow inside and constituted by curved surfaces. FIG. 17 illustrates an example of a robot, and is a schematic view of an articulated robot that is commonly known. As illustrated in FIG. 17, in an articulated robot arm, plural link portions 171 are relatively driven via plural joints 172. The product 100 illustrated in FIG. 1A corresponds to one of the plural link portions 171 illustrated in FIG. 17.

The flange portions 101 and 102 are connected to the shaped portion 103, and the flange portions 101 and 102 and the shaped portion 103 are integrated as the product 100. The flange portions 101 and 102 engage with finely produced parts of the joint 172 such as bearings when the product 100 is used as a part of the structure of a robot, and thus a high precision of shape is required for the flange portions 101 and 102. Specifically, the flange portions 101 and 102 need to be produced with a dimensional precision of error of 50 μm or smaller and a surface roughness Ra of 1.6 μm or smaller. In addition, screw holes and pin holes for fixing the flange portions 101 and 102 to devices such as reduction gears that are parts of the joints 172 are provided with a high positional precision.

That is, the flange portion 101 includes a first surface 101a, a second surface 101b, and a first attachment portion 101c provided on the second surface 101b. The flange portion 102 includes a third surface 102a, a fourth surface 102b, and a second attachment portion 102c provided on the fourth surface 102b. In the description, the flange portions 101 and 102 may be sometimes referred to as first and second members, respectively.

In contrast, the shaped portion 103 is a tube including a curved surface shape in the present exemplary embodiment, and, although the shaped portion 103 needs to be thin for requirement of reducing the weight of a link portion of a robot arm, the requirement for the precision of shape of the shaped portion 103 is not as high as the requirement for the precision of shape of the flange portions 101 and 102. In addition, the shaped portion 103 includes a first end portion 101A and a second end portion 102A that serve as boundary portions between the flange portions 101 and 102 and the shaped portion 103. The first end portion 101A is connected to the first surface 101a by sintering, and the second end portion 102A is connected to the third surface 102a by sintering. Although an example in which the shaped portion 103 is a tube including a curved surface shape is described in the present exemplary embodiment, the shaped portion 103 is not limited to this example. In addition, in the present exemplary embodiment, the shaped portion 103 may be sometimes referred to as a shaped object or a tube portion.

Method of Production

In the present exemplary embodiment, a product that includes a portion requiring a high precision of shape and a portion acceptable with a relatively low precision of shape and has an overall complex outer shape is produced as follows.

The method of production of the present exemplary embodiment will be described with reference to FIGS. 1 to 7. FIG. 3 is a flowchart illustrating steps of the method of production.

First, in step S1 of FIG. 3, a portion to be prepared as a member in advance and a portion to be formed on the prepared member by selective laser sintering are distinguished in the overall shape of the product 100, and the shape of each portion is designed.

The portion to be prepared as a member in advance is a portion for which a high precision of shape that is difficult to achieve in selective laser sintering. In the example of the product 100 illustrated in FIG. 1A, the flange portions 101 and 102 correspond to the portion.

The portion to be formed on the member by selective laser sintering is a portion that is not practically problematic for the function and production yield of the product even in the case where a tolerance of the portion is set in accordance with the precision of shape that can be achieved by selective laser sintering. In the example of the product 100, the tube portion 103 corresponds to the portion.

In the description below, the portion to be prepared as a member in advance may be sometimes referred to as a "member portion", and the portion to be formed on the member by selective laser sintering may be sometimes referred to as a "sintered powder portion".

In designing the shapes of the portions, the shape of a boundary surface between the member portion and the sintered powder portion is determined in consideration of requirement in production steps of forming the sintered powder portion.

That is, the boundary surface between the member portion and the sintered powder portion is desirably set to be substantially flat. The sintered powder portion is formed by depositing layers of raw material powder on the boundary surface and then locally and selectively irradiating the raw material powder with laser light to sinter part of the raw material powder. To facilitate depositing a layer of the raw material powder at a uniform thickness, the boundary surface is desirably a substantially flat surface.

In addition, in the case where plural boundary surfaces are present, to facilitate depositing a layer of the raw material powder at a uniform thickness, the plural boundary surfaces are desirably set to be flat surfaces parallel to one another. More desirably, the plural boundary surfaces are set to be present at the same height, that is, in one plane.

In addition, the position of the boundary surface is desirably set such that a powder layering tool such as a squeegee or a roller can be easily driven and that no portion of the member portion projects further than the boundary surface such that no portion blocks the laser light irradiating a powder layer.

Considering above, in the present exemplary embodiment, a boundary surface 101A illustrated in FIG. 1B is set as the boundary between the flange portion 101 serving as a member portion and the tube portion 103 serving as the sintered powder portion. That is, the boundary surface 101A serves as the first end portion of the tube portion 103. Similarly, a boundary surface 102A is set as the boundary between the flange portion 102 and the second end portion of the tube portion 103. That is, the boundary surface 102A serves as the second end portion of the tube portion 103. The boundary surfaces 101A and 102A are set to be ring-shaped flat surfaces present in the same plane.

After the shapes of the member portions and the sintered powder portion are determined, the members are prepared in accordance with designed shapes of the member portions in step S2 of FIG. 3.

Figure 2:
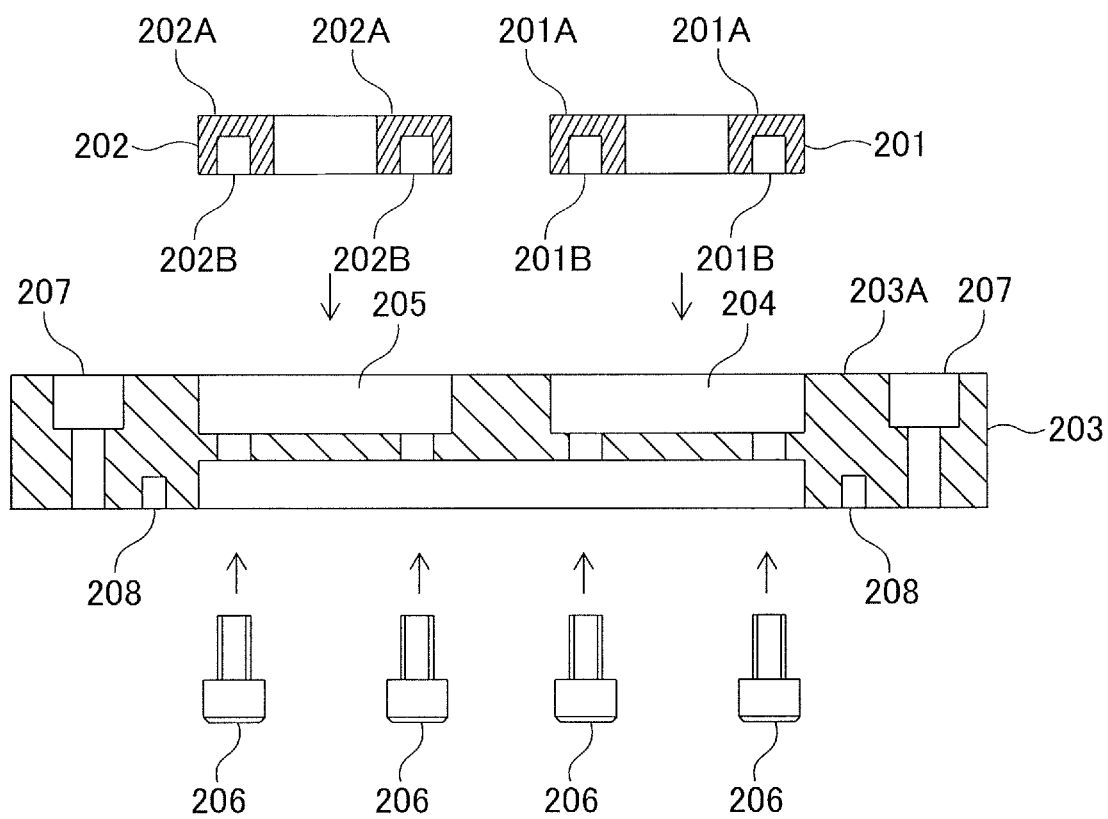
FIG. 2 is a schematic section view of members and a plate of the first exemplary embodiment.
Figure 3:
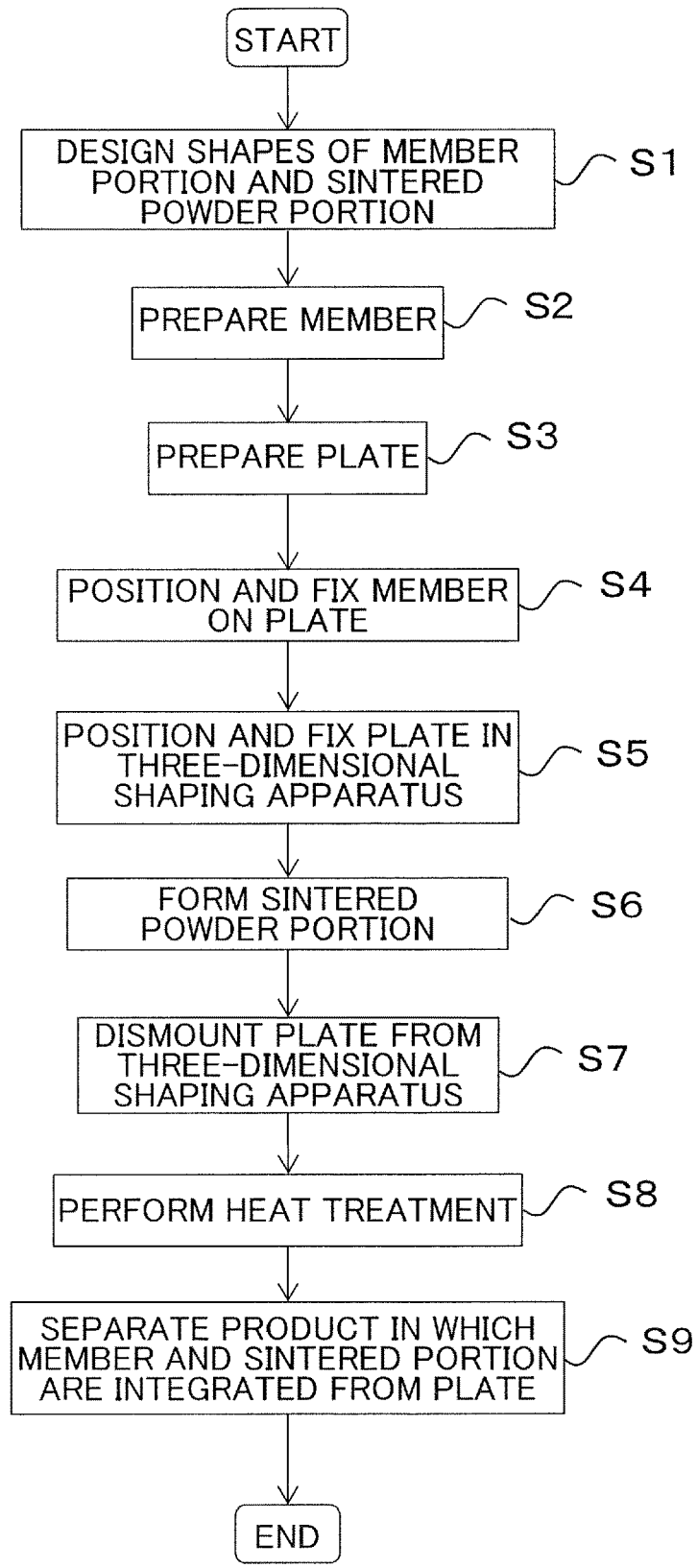
FIG. 3 is a flowchart of a method of production according to exemplary embodiments.

Specifically in the present exemplary embodiment, flange members 201 and 202 illustrated in FIG. 2 are prepared. The flange members 201 and 202 illustrated in FIG. 2 are members corresponding to the flange portions 101 and 102 that are constituents of the product 100 illustrated in FIG. 1. In FIG. 2, the flange members 201 and 202 are illustrated in schematic section view in which the shapes thereof are simplified for the sake of convenience of illustration. An upper surface 201A of the flange member 201 serving as a first surface corresponds to the boundary surface 101A illustrated in FIG. 1B, and, similarly, an upper surface 202A of the flange member 202 serving as a third surface corresponds to the boundary surface 102A. The upper surfaces 201A and 202A have high flatness such that raw material powder for sintering can be deposited at a constant thickness. These surfaces may be subjected to surface roughening treatment such that these surfaces have microscopically large surface roughness to improve adhesion strength between the members and the sintered powder portion.

The flange members 201 and 202 are respectively provided with screw holes 201B and 202B for positioning and fixing the flange members 201 and 202 on a plate 203 that will be described later. The shapes of the screw holes are desirably set such that fixing members, for example, bolts, of the same shape can be used both when fixing the flange members 201 and 202 on the plate and when assembling a structure such as a robot arm by combining the product 100 with other parts. As a matter of course, the screw holes may be provided only for fixing the flange members 201 and 202 on the plate 203.

The flange members 201 and 202 include portions requiring a high precision of shape as described above, and thus are produced by using a production apparatus, such as a lathe or a machining center, having a higher precision of shape than the additive manufacturing apparatus. In some case, commercially available parts whose precision of shape is ensured may be used as the flange members, or additional machining may be performed on the commercially available parts to use the commercially available parts as the flange members.

Next, a plate for supporting the members at predetermined positions when forming the sintered powder portion is prepared in step S3 of FIG. 3.

Specifically, the plate 203 illustrated in FIG. 2 is prepared in the present exemplary embodiment. In FIG. 2, the plate 203 is illustrated in schematic section view in which the shape thereof is simplified for the sake of convenience of illustration.

The flange members 201 and 202 can be fixed on the plate 203 via screws 206. Recess portions 204 and 205 are respectively provided for positioning the flange members 201 and 202 such that the flange members 201 and 202 take positions and postures in accordance with the shape of the product 100 to be produced.

Therefore, the plate 203 is desirably formed such that the recess portions 204 and 205 have shapes in which the side surfaces and bottom surfaces of the recess portions 204 and 205 function as positional standards of the flange members 201 and 202. In addition, the relative positions of the recess portions 204 and 205 are set such that the recess portions 204 and 205 are in a positional relationship according to the shape of the product 100 to be produced.

In addition, in order to facilitate depositing the raw material powder on the upper surfaces of the members at a constant thickness, in the present exemplary embodiment, the recess portions 204 and 205 are set such that the upper surfaces 201A and 202A of the flange members 201 and 202 are in the same plane when the plate 203 supports the flange members 201 and 202. In addition, the bottom surfaces of the recess portions 204 and 205 are set such that the upper surfaces 201A and 202A of the flange members 201 and 202 are at the same height as an upper surface 203A of the plate 203 or project further upward than the upper surface 203A.

In addition, the plate 203 is mounted on and dismounted from the additive manufacturing apparatus as will be described later, and thus is provided with screw holes 207 for fixation and pin holes 208 serving as positional standards. The plate 203 can be formed with a high precision of, for example, an error of 50 μm or smaller, by using a machining apparatus such as a machining center.

After the members and the plate are prepared, the members are positioned and fixed on the plate in step S4 of FIG. 3.

Here, as a method of fixing with which fixation can be performed by a strong force and can be released afterwards, fastening with bolts is used. However, in some case, fixation using a clamper that is another mechanical fixing means, magnetic fixation using a magnet, or fixation using an attraction mechanism that performs, for example, air suction or electrostatic attraction may be employed.

In the present exemplary embodiment, the following method is performed to improve the positional precision when fixing the flange members 201 and 202 on the plate 203.

First, the flange members 201 and 202, the plate 203, and the screws 206 are placed in an environment of the same temperature such that these components are at substantially the same temperature. This is performed because, in the case where there is a temperature difference between components to be combined, there occurs an unbalance of expansion and contraction after assembly and the positional relationship between the components becomes erroneous when mounting these components on the additive manufacturing apparatus. These components may be stored in an environment of the same temperature until immediately before assembly, or the temperatures of the components may be equalized by placing the components in a thermostat chamber after temporary assembly before fixing has been performed.

Then, the components whose temperatures are approximately equalized are arranged and fixed such that the components are in a predetermined positional relationship. That is, the flange member 201 is fixed to the recess portion 204 of the plate 203 via the screws 206. Similarly, the flange member 202 is fixed to the recess portion 205 of the plate 203 via the screws 206.

The upper surfaces 201A and 202A of the flange members 201 and 202 are positional standards, that is, shaping starting surfaces, when later performing three-dimensional shaping by powder sintering, and thus are desirably fixed in the height direction with an error of, for example, 50 μm or smaller. To secure this precision of shape, in the present exemplary embodiment, whether the error is within a predetermined range is examined by setting the plate 203 on which the flange members 201 and 202 have been fixed in a measurement apparatus as illustrated in FIG. 4 and measuring the positions and postures of the upper surfaces 201A and 202A.

Figure 4:
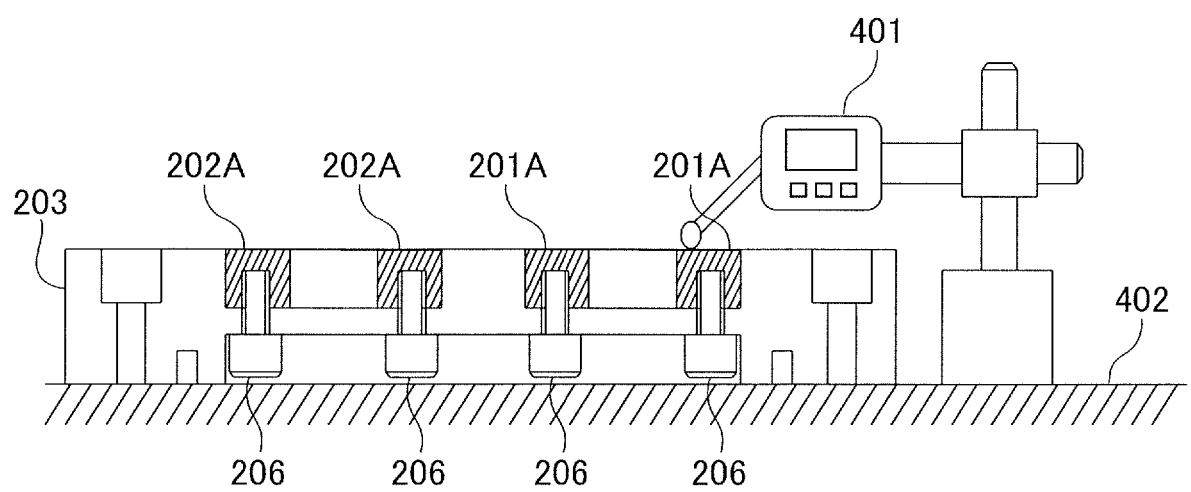
FIG. 4 illustrates position measurement of an upper surface of the members set on the plate.

In FIG. 4, the plate 203 on which the flange members 201 and 202 have been fixed and a height gauge 401 capable of fine measurement are mounted on a surface plate 402. A measurement environment of FIG. 4 is adjusted to a constant temperature by a temperature adjustment mechanism that is not illustrated. The height gauge 401 measures the heights of the upper surfaces 201A and 202A of the flange members 201 and 202 and the height of the upper surface 203A of the plate 203, and checks whether the error is within the predetermined range.

In the case where the error is not within the predetermined range, the positions of the flange members 201 and 202 are adjusted. As a method of position adjustment, the screws 206 are temporarily loosened until the flange members 201 and 202 become movable with respect to the plate 203, and then the flange members 201 and 202 and are positioned and fixed again.

Figure 5:
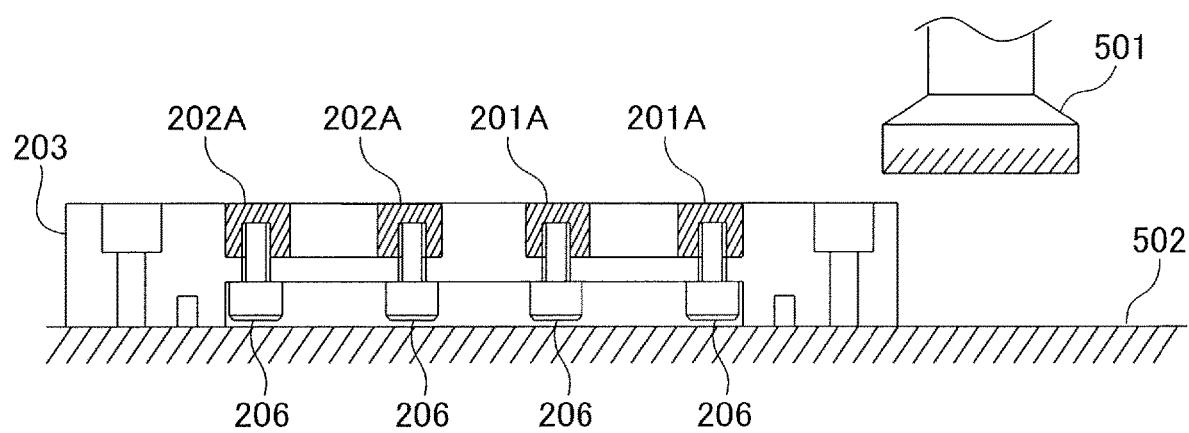
FIG. 5 illustrates treatment on the upper surface of the members set on the plate.

As another method of position adjustment, the plate 203 on which the flange members 201 and 202 have been fixed is set in a processing machine, and thus the heights of the upper surfaces 201A and 202A are adjusted. For example, as illustrated in FIG. 5, the plate 203 on which the flange members 201 and 202 have been fixed can be set on a processing table 502, and cutting can be performed by using a milling cutter 501 such that the heights of the upper surfaces 201A and 202A are equalized.

In addition, by setting the plate 203 on which the flange members 201 and 202 have been fixed in a processing machine or a cleaning apparatus, not only readjustment of the positions but also processing such as cleaning treatment of the surfaces of the flange members 201 and 202 and surface roughening treatment for improving the adhesion of a sintered portion can be performed.

In the present exemplary embodiment, members are positioned and fixed on a carriable plate, and the plate is then mounted on the additive manufacturing apparatus. Therefore, positioning, fixing, checking and adjusting the fixed position, surface treatment, and so forth can be performed easily before mounting the plate on the additive manufacturing apparatus.

If the members are directly fixed on a shaping stage of the additive manufacturing apparatus, position measurement, readjustment, and surface treatment will be performed on the stage of the additive manufacturing apparatus. However, this is difficult due to restriction of an apparatus layout. Even if this is possible, in the case where fixation, position measurement, and readjustment are performed in the additive manufacturing apparatus, shaping operation cannot be performed while performing these, and thus the practical rate of operation of the additive manufacturing apparatus decreases.

In contrast, in the present exemplary embodiment, members are positioned and fixed on a plate. Since the plate is carriable, the fixation can be performed easily and the plate can be easily set in the position measurement apparatus and the processing apparatus unlike the case of the shaping stage of the additive manufacturing apparatus. In addition, even in the case where it is determined that readjustment of the positions is necessary as a result of measurement, the additive manufacturing apparatus does not have to be stopped. Another plate can be set in the additive manufacturing apparatus while the plate is subjected to readjustment, and thus the rate of operation of the additive manufacturing apparatus does not decrease. In addition, surface treatment or the like can be performed easily after positioning and fixing the members, and the additive manufacturing apparatus does not have to be stopped while the surface treatment or the like is performed.

Then, after the members are fixed on predetermined positions on the plate, the plate is set in the additive manufacturing apparatus in step S5 of FIG. 3, and the sintered powder portion is shaped in step S6 of FIG. 3.

Figure 6:
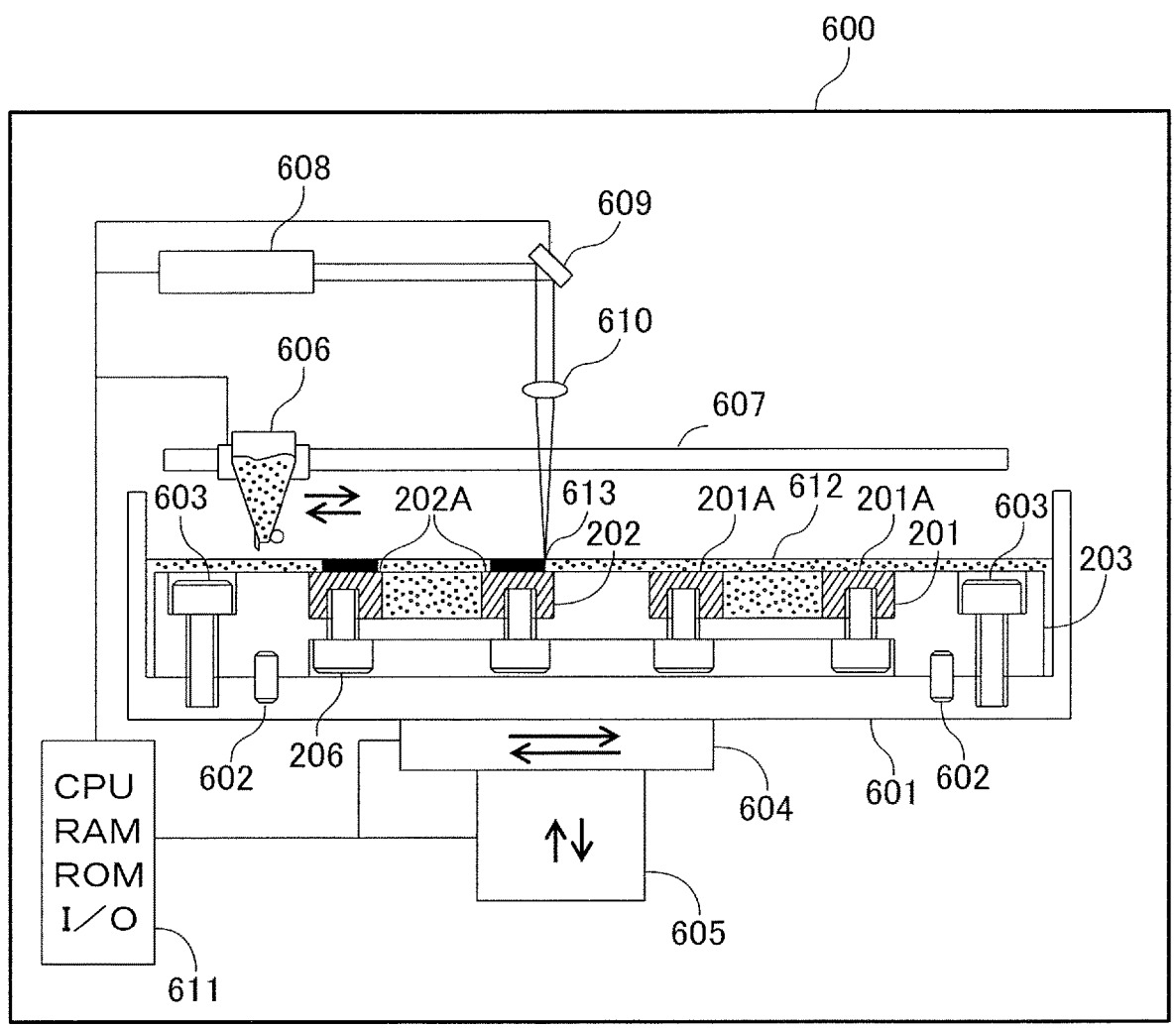
FIG. 6 illustrates an additive manufacturing apparatus according to exemplary embodiments.

First, the basic configuration of an additive manufacturing apparatus 600 used in the present exemplary embodiment will be described with reference to FIG. 6. A shaping table 601 is a table on which the plate 203 on which the flange members 201 and 202 have been fixed is to be mounted, and includes pins 602 serving as positional standards. The plate 203 is positioned by engaging the pins 602 with the pin holes 208 of the plate 203. In the present exemplary embodiment, the plate 203 is fixed to the shaping table 601 via screws 603. The shaping table 601 is supported by a horizontal movement mechanism 604 and a vertical movement mechanism 605 so as to be movable in the horizontal direction and the vertical direction.

A powder deposition device 606, a movement guide 607, a laser light source 608, a scanner 609, and a condensing lens 610 are disposed above the shaping table 601. The powder deposition device 606 is a device for depositing powder serving as a raw material to a predetermined thickness, and is supported by the movement guide 607 so as to be movable in the horizontal direction. The laser light source 608, the scanner 609, and the condensing lens 610 constitute an irradiation optical system for locally and selectively irradiating a raw material powder layer with laser light.

A controller 611 is a computer for controlling operations of the additive manufacturing apparatus 600, and includes a central processing unit: CPU, a read-only memory: ROM, a random access memory: RAM, an input/output port: I/O port, and so forth. The ROM stores an operation program for the additive manufacturing apparatus 600. The I/O port is connected to an external apparatus and a network, and, for example, data necessary for three-dimensional shaping can be input and output therethrough. The controller 611 is connected to the components such as the horizontal movement mechanism 604 and the vertical movement mechanism 605 of the shaping table 601, the powder deposition device 606, the laser light source 608, the scanner 609, and the condensing lens 610, and controls operations of these components.

In the present exemplary embodiment, the plate is mounted on the additive manufacturing apparatus as follows. First, the plate 203 is positioned and fixed on the shaping table 601. That is, the plate 203 is fixed at such a position that the raw material powder can be deposited and irradiated with laser light on the upper surfaces 201A and 202A of the flange members 201 and 202. In addition, the plate 203 is fixed such that the upper surfaces 201A and 202A of the flange members 201 and 202 are horizontal to facilitate forming a powder layer thereon.

After the plate 203 is mounted, the additive manufacturing apparatus 600 is caused to operate as follows, and thus the sintered powder portion is formed on the flange members 201 and 202. First, the controller 611 transmits an instruction to the horizontal movement mechanism 604 and the vertical movement mechanism 605 to move the shaping table 601 to an initial position for performing a shaping operation.

Next, the controller 611 transmits an instruction to the powder deposition device 606 to deposit raw material powder on the upper surfaces 201A and 202A of the flange members 201 and 202 to form a first raw material powder layer 612. When forming a powder layer, the powder deposition device 606 deposits powder while moving above the shaping table 601 along the movement guide 607. To facilitate depositing the powder on the upper surfaces 201A and 202A at a predetermined thickness, the powder is also deposited on the upper surface 203A of the plate 203 in the vicinity of the flange members 201 and 202 and on recess portions of the flange members 201 and 202.

After the first powder layer 612 is formed, the controller 611 transmits instructions to the horizontal movement mechanism 604, the laser light source 608, the scanner 609, and the condensing lens 610, irradiates a portion of the raw material powder layer 612 corresponding to the shape of the product to be shaped with laser light and thereby sinters the irradiated portion. Laser light radiated from the laser light source 608 is scanned in a direction perpendicular to a sheet surface of FIG. 6 by the scanner 609. This direction will be referred to as a main scanning direction. The laser light is condensed into a very small region in the powder layer 612 by the condensing lens 610, thereby a portion corresponding to the region is locally heated, and the locally heated portion of the powder layer 612 is sintered. A direction in which the shaping table 601 is moved by the horizontal movement mechanism 604, that is, a left-right direction in FIG. 6, will be referred to as a sub-scanning direction. A sintered portion 613 can be formed by irradiating an arbitrary portion of the powder layer 612 with laser light by turning the laser light source 608 on and off while performing scanning in both the main scanning direction and the sub-scanning direction. The controller 611 causes, on the basis of the shape data of the sintered powder portion determined in step S1, radiation of laser light in accordance with a shape pattern of the first layer to be formed to sinter the powder. Specifically, the shape of a portion designed to be formed by selective laser sintering determined in step S1, that is, designed shape data of a shaped object, is divided into plural layers, and thus data indicating a portion to be irradiated with the laser light is generated for each of the plural layers. Then, the laser light is radiated on the basis of the generated data, that is, slice data, and thus the powder is sintered. It is preferable that shape data of the first end portion and second end portion of the tube portion 103 is included in a shape pattern of at least one of the plural layers. It is particularly preferable that the shape data of the first end portion and second end portion is included in a shape pattern of the first layer of the plural layers.

After sintering of the first layer is completed as described above, the controller 611 transmits an instruction to the vertical movement mechanism 605 to move down the shaping table 601 by a distance corresponding to a thickness of one layer, and further transmits an instruction to the powder deposition device 606 to deposit a second raw material powder layer. Subsequently, the controller 611 transmits instructions to the horizontal movement mechanism 604, the laser light source 608, the scanner 609, and the condensing lens 610, and causes radiation of laser light in accordance with a shape pattern of the second layer to form a sintered portion of the second layer.

Figure 7:
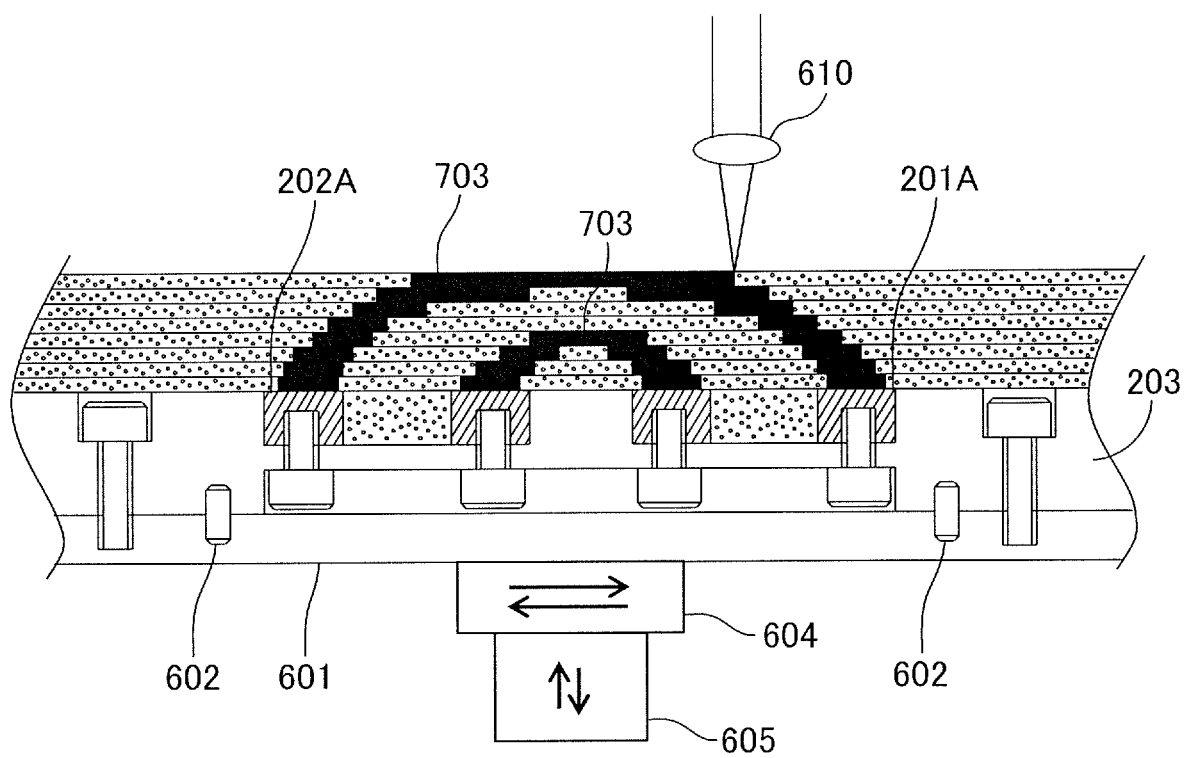
FIG. 7 schematically illustrates three-dimensional shaping according to the first exemplary embodiment in section view.

Sintered portions of respective layers are sequentially formed by repetitively performing similar steps, and thus a sintered powder portion 703 having a shape determined in step S1 is formed as illustrated in schematic section view in FIG. 7. Although schematic illustration is given in FIG. 7 for the sake of convenience of illustration, the actual raw material powder includes fine particles with a particle diameter in the range of several micrometers to several tens of micrometers, and the powder layer is a thin layer having a thickness of about several tens of micrometers for one layer. Therefore, in the case of, for example, forming the tube portion 103 of the product 100, tremendous number of layers are formed.

In the present exemplary embodiment, powder of metal particles or powder of metal particles mixed with binder particles that interconnect the metal particles is used as the raw material powder. To improve the adhesion between a flange member and a sintered portion, the material of the powder and the material of the upper surface of the flange member, that is, the shaping starting surface, are mutually diffused or melted to adhere to each other when being heated to a high temperature by laser light. Therefore, it is desirable that a combination of materials having high affinity with each other is selected. For example, it is desirable that iron-based materials or aluminum-based materials are used for both of the material of the shaping starting surface of the part and the powder material. Of course, the materials of the part and powder may be different from the present exemplary embodiment depending on the product to be produced. For example, powder of resin such as nylon or powder of mixture of ceramic particles and binder particles may be used.

In this way, a sintered portion corresponding to the tube portion 103 is formed on the flange portions 101 and 102, and, after the shape of the product 100 is completed, the plate 203 is dismounted from the shaping table 601 of the additive manufacturing apparatus 600 by loosening the screws 603 in step S7 of FIG. 3.

Next, the plate 203 on which the product 100 is still fixed is moved to a heat treatment apparatus, and internal stress accumulated in the shaped object is relieved by heat treatment in step S8 of FIG. 3.

When performing three-dimensional shaping by selective laser sintering, sintering is performed at a high temperature. However, the dimension of the three-dimensionally shaped object changes due to reduction of the temperature after completion of the shaping. The influence of this dimensional change can be reduced by relieving the internal stress accumulated in the three-dimensionally shaped object by heat treatment.

Therefore, in the present exemplary embodiment, by annealing, that is, performing heat treatment on a completed product fixed to the plate, the stress is relieved while retaining the dimension. For example, in the case where the material is iron-based, treatment of gradually cooling down the material from 500° C. is performed as stress-relief annealing. To be noted, even if the dimension of the shaped object changes, this heat treatment step can be omitted in the case where the dimensional change is within a range acceptable for the specification of the product.

Next, the bolts fastening the product 100 is removed, and thus the completed product 100 is detached from the plate 203 in step S9 of FIG. 3.

A product produced in this way is constituted by a portion three-dimensionally shaped by sintering and flange portions formed by machining. In addition, since powder of sintering material in the vicinity of a boundary surface and a material of the members have melted and firmly bonded to each other when performing laser sintering, the product has a sufficient structural strength.

The flange portions at both ends have high precision of shape, and thus there is no need to improve the precision thereof by performing machining after performing the three-dimensional shaping by sintering. Therefore, the production cost is lower than conventional three-dimensional shaping. In addition, the product described in the present exemplary embodiment can be used as, for example, a part of a robot combinable with another part with a high precision.

In addition, by separating the shaped product from the plate after performing annealing to relieve the stress, the influence of deformation after shaping can be reduced.

In addition, a product including a portion requiring a high precision of shape can be produced at low costs by using selective laser sintering.

Second Exemplary Embodiment

In the first exemplary embodiment, in the plate 203 illustrated in FIG. 2, the positions of the recess portions 204 and 205 for fixing the flange members 201 and 202 are determined in accordance with the dimension of the shape of the product 100. Further, annealing is performed as necessary to suppress change of the dimension of shape caused by cooling after the step of sintering the powder.

In a second exemplary embodiment, to reduce the influence of dimensional change after completion of the shaping, recess portions are provided at positions offset in advance in consideration of contraction caused by cooling after completion of the shaping such that the shape of the product becomes closer to the designed shape after contraction, and the members are attached to the plate via these recess portions.

Figure 8A:
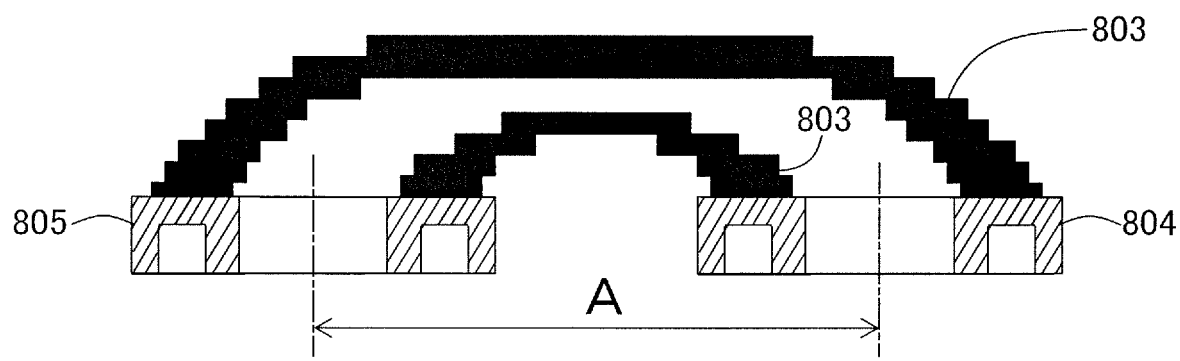
FIG. 8A is a schematic section view of a product of a second exemplary embodiment illustrating a shape thereof immediately after being shaped.
Figure 8B:
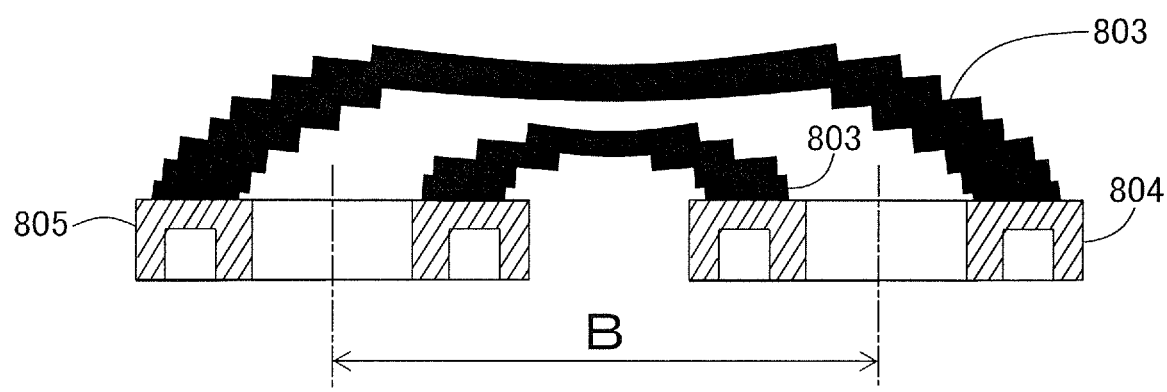
FIG. 8B is a schematic section view of the product of the second exemplary embodiment illustrating the shape thereof after being cooled.

FIG. 8A illustrates the shape of the product at a high temperature immediately after shaping, and FIG. 8B illustrates the shape of the product that has been sufficiently cooled after completion of shaping. These figures indicate that the distance between centers of flange members 804 and 805 changes from A to B as a result of contraction of a sintered portion 803 caused by cooling. Here, A>B holds.

To obtain a product having a designed shape after contraction, the shape of the plate may be designed by offsetting the positions of recess portions such that the flange members are fixed at positions away from each other by a distance in which the amount of contraction is added to the designed shape of the product. Thermal deformation simulation is effective for determining the amount of offset correction. Alternatively, the amount of offset correction may be determined by simple calculation. For example, when it is assumed that the temperature increase is 100° C., the dimension is 300 mm, and the linear thermal expansion coefficient is 30 ppm/° C., the dimensional change is 0.9 mm. In addition, the amount of contraction may be measured by actually producing a three-dimensionally shaped object as a trial.

As a result of producing a product by preparing a plate 203 having offset recess portions in step S3 of FIG. 3 and performing the other steps in a similar manner to the first exemplary embodiment, a product with a higher precision of shape can be produced.

Third Exemplary Embodiment

Figure 9:
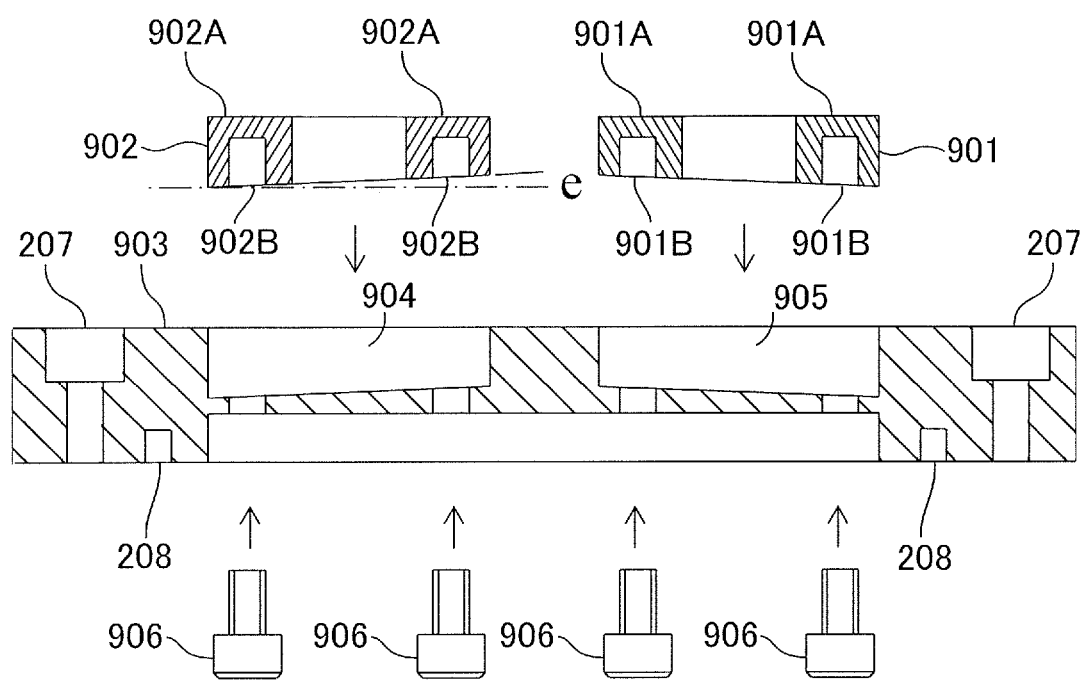
FIG. 9 is a schematic section view of members and a plate of a third exemplary embodiment.

In the present exemplary embodiment, not only the change in the distance between members caused by the dimensional change of the sintered portion after shaping but also angular change is corrected. FIG. 9 corresponds to FIG. 2 of the first exemplary embodiment. As illustrated in FIG. 9, bottom surfaces of members 901 and 902 are each formed in a shape inclined by an angle e in steps S1 and S2 of FIG. 3.

Further, bottom surfaces, in other words, abutting surfaces, of recess portions 904 and 905 of a plate 903 are also each inclined by the same angle e in step S3 of FIG. 3.

Figure 10:
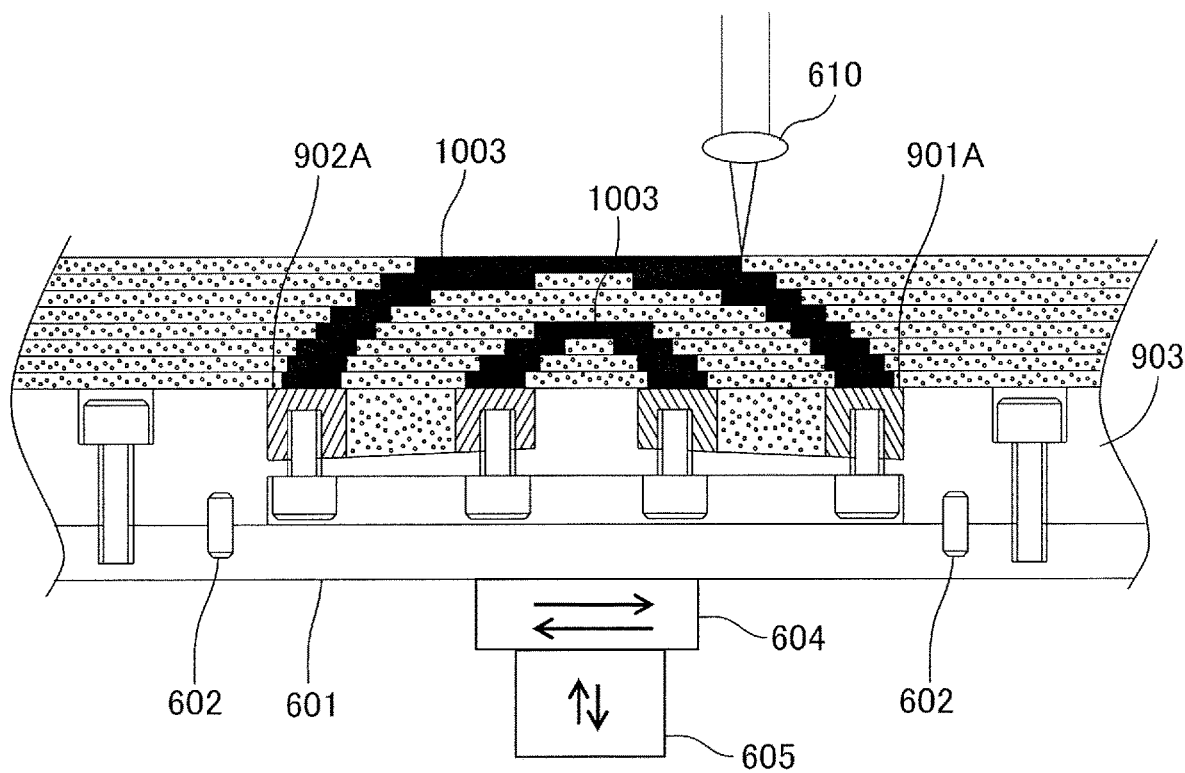
FIG. 10 schematically illustrates three-dimensional shaping according to the third exemplary embodiment in section view.

The members 901 and 902 are fixed to the plate 903 by using screw holes 901B and 902B provided in the members 901 and 902 and bolts 906. Thus, upper surfaces 901A and 902A of the members 901 and 902 serving as shaping starting surfaces become horizontal in step S4 of FIG. 3 as illustrated in FIG. 10.

Then, deposition and sintering are repetitively performed similarly to the first exemplary embodiment and the second exemplary embodiment to form a sintered portion 1003.

Figure 11A:
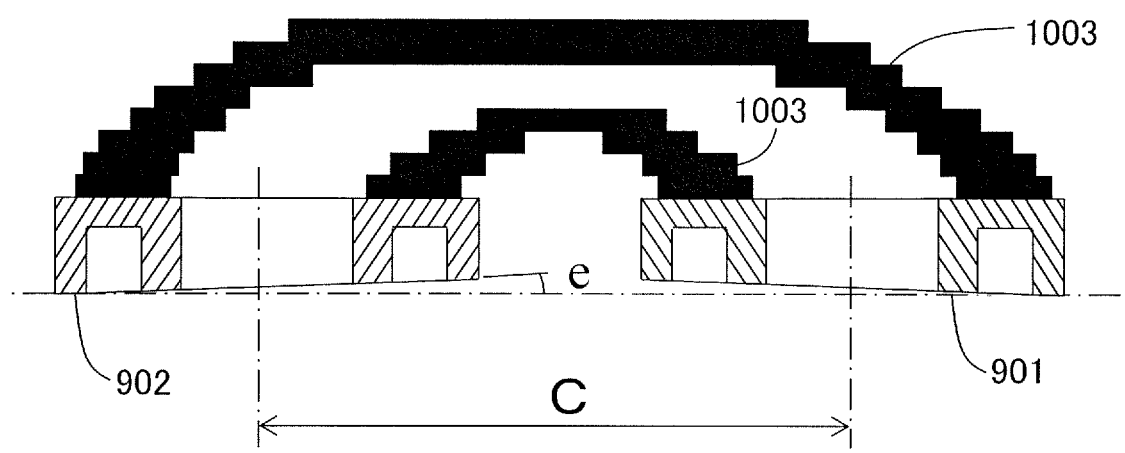
FIG. 11A is a schematic section view of a product of the third exemplary embodiment illustrating a shape thereof immediately after being shaped.
Figure 11B:
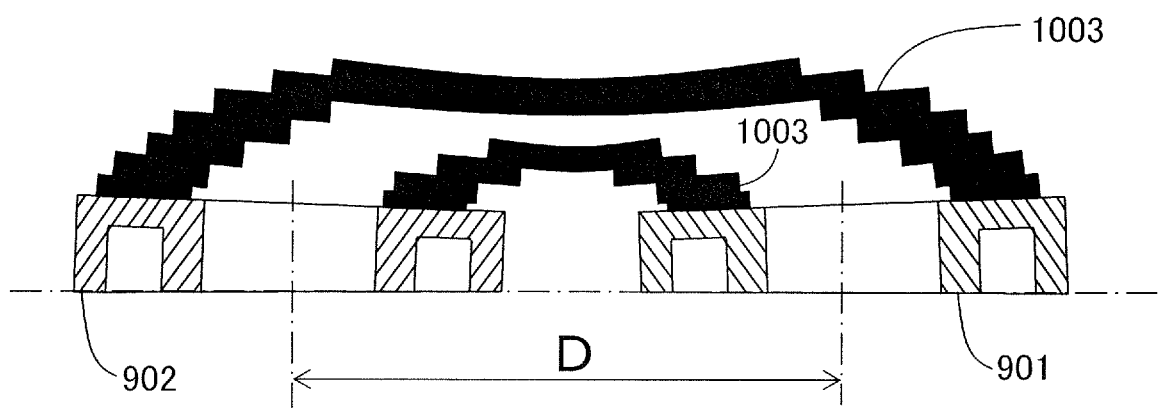
FIG. 11B is a schematic section view of the product of the third exemplary embodiment illustrating the shape thereof after being cooled.

FIG. 11A illustrates the shape of the product at a high temperature immediately after shaping, and FIG. 11B illustrates the shape of the product that has been sufficiently cooled. The distance between the centers of the members 901 and 902 is C and the angle of inclination of the members 901 and 902 is e immediately after shaping. However, the distance is D and the members 901 and 902 are horizontal after cooling.

As described above, according to the present exemplary embodiment, the influence of contraction occurring in cooling after shaping can be corrected in terms of not only the dimension but also the angle of inclination. As a method of determining the dimension and the angle e, thermal deformation simulation, simple calculation, or experimental measurement using trial production can be used effectively.

Fourth Exemplary Embodiment

Figure 12:
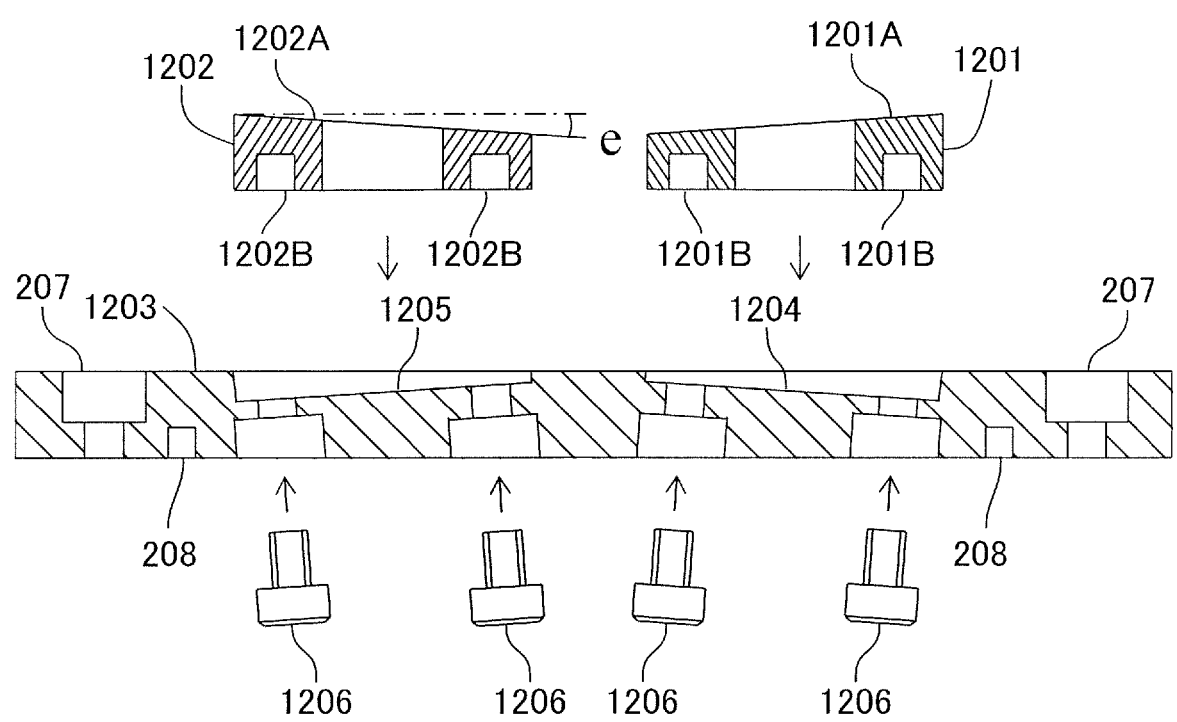
FIG. 12 is a schematic section view of members and a plate of a fourth exemplary embodiment.

In contrast to the third exemplary embodiment in which the bottom surfaces of the members are inclined, in the present exemplary embodiment, upper surfaces of the members are inclined. FIG. 12 corresponds to FIG. 9 of the third exemplary embodiment. As illustrated in FIG. 12, in the present exemplary embodiment, upper surfaces 1201A and 1202A of members 1201 and 1202 are each inclined by an angle e, and screw holes 1201B and 1202B are provided in the bottom surfaces thereof in steps S1 and S2 of FIG. 3.

Further, bottom surfaces, in other words, abutting surfaces, of recess portions 1204 and 1205 of a plate 1203 are inclined with respect to the horizontal surface by the angle e in directions opposite to the inclination of the upper surfaces 1201A and 1202A, and counterbored holes for bolts are also inclined by the angle e in step S3 of FIG. 3.

Figure 13:
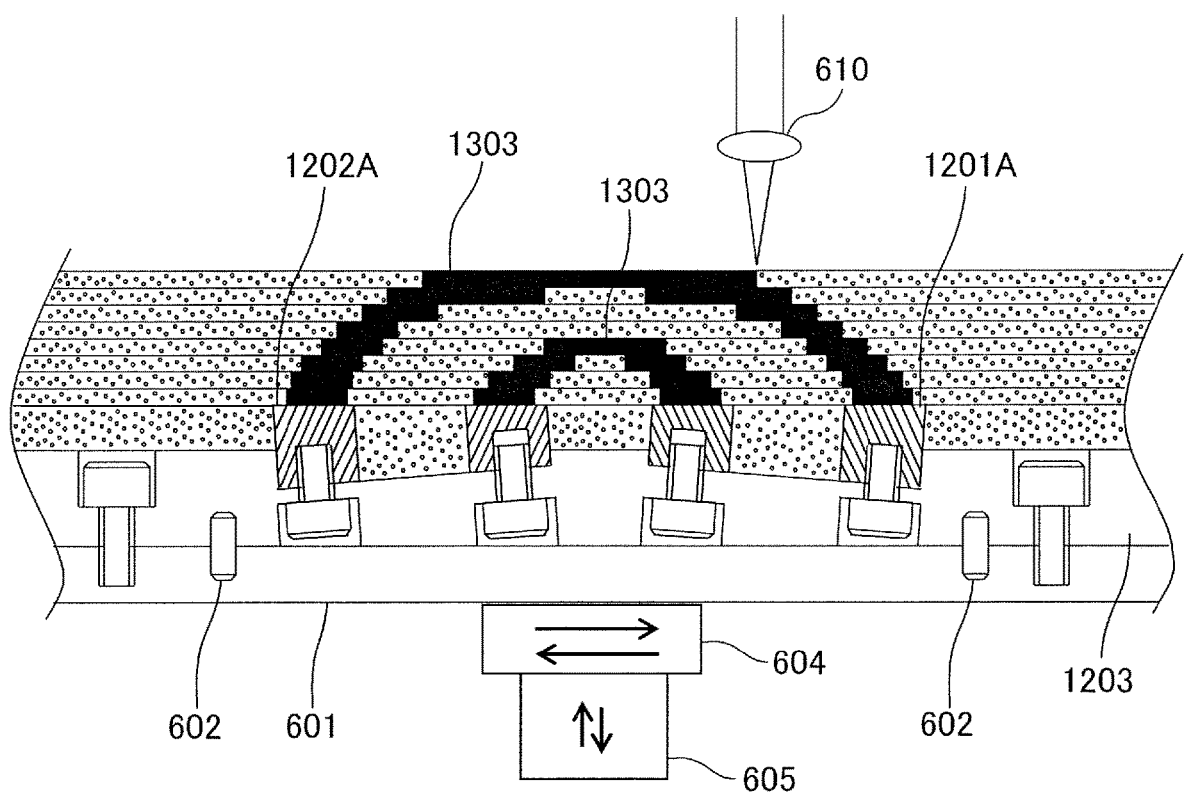
FIG. 13 schematically illustrates three-dimensional shaping according to the fourth exemplary embodiment in section view.

The members 1201 and 1202 are fixed to the plate 1203 by using bolts 1206 in step S4 of FIG. 3. Thus, the upper surfaces 1201A and 1202A serving as the shaping starting surfaces become horizontal as illustrated in FIG. 13.

Then, deposition and sintering are repetitively performed similarly to the first exemplary embodiment and the second exemplary embodiment, and thus a sintered portion 1303 is formed.

Figure 14A:
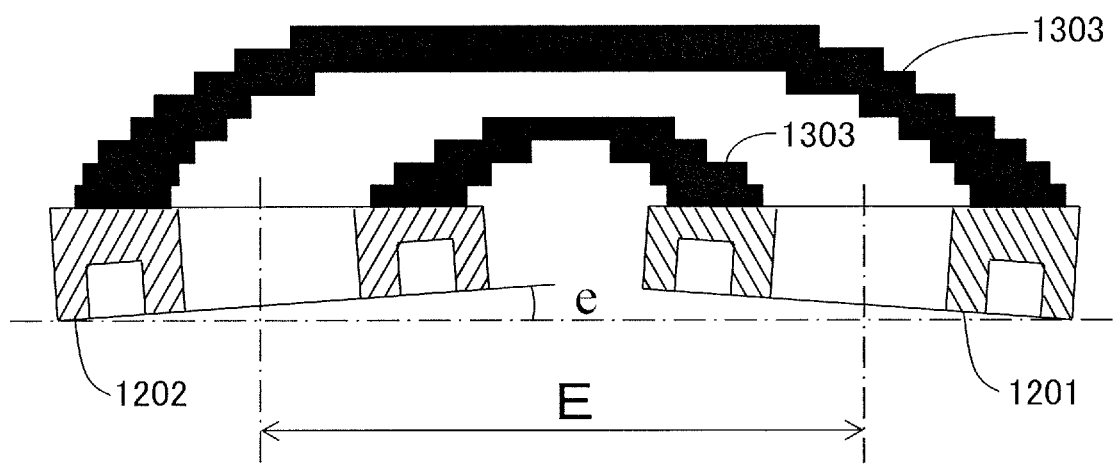
FIG. 14A is a schematic section view of a product of the fourth exemplary embodiment illustrating a shape thereof immediately after being shaped.
Figure 14B:
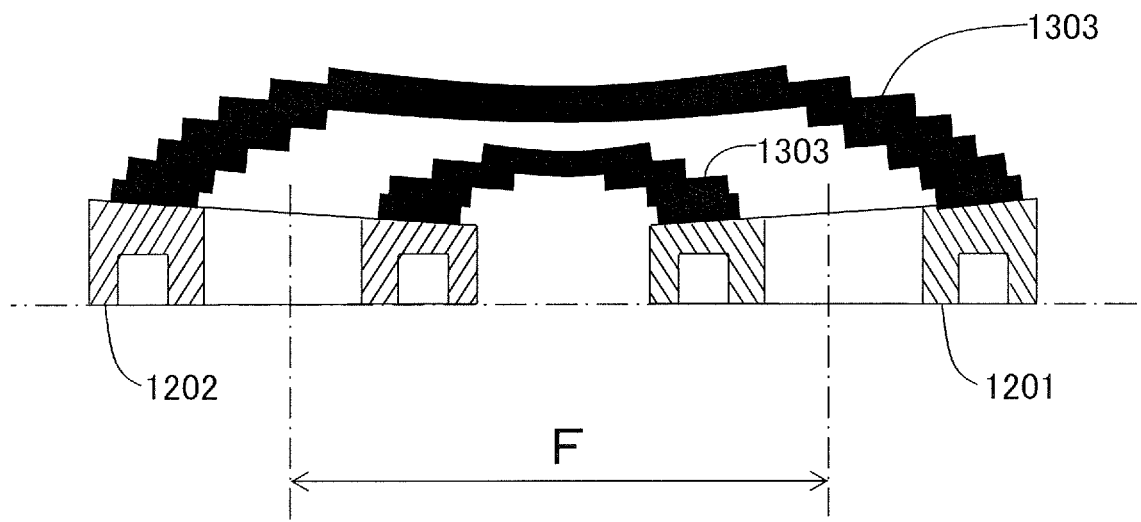
FIG. 14B is a schematic section view of the product of the fourth exemplary embodiment illustrating the shape thereof after being cooled.

FIG. 14A illustrates the shape of the product at a high temperature immediately after shaping, and FIG. 14B illustrates the shape of the product that has been sufficiently cooled. The distance between the centers of the members 1201 and 1202 is E and the angle of inclination of the members 1201 and 1202 is e immediately after shaping. However, the distance is F and the members 1201 and 1202 are horizontal after cooling.

As described above, according to the present exemplary embodiment, the influence of contraction occurring in cooling after shaping can be corrected in terms of not only the dimension but also the angle of inclination. In the present exemplary embodiment, as illustrated in FIG. 14B, screw holes of the final product can be perpendicular to the bottom surfaces thereof. Therefore, assembly operation can be performed easily when attaching and fixing the product to another product. As a method of determining the dimension and the angle e, thermal deformation simulation, simple calculation, or experimental measurement using trial production can be used effectively.

Fifth Exemplary Embodiment

The present exemplary embodiment is an example of producing a product different from the first to fourth exemplary embodiments, and is different in the method of fixing a member on a plate. Description of portions common to the first to fourth exemplary embodiments will be simplified.

Figure 15A:
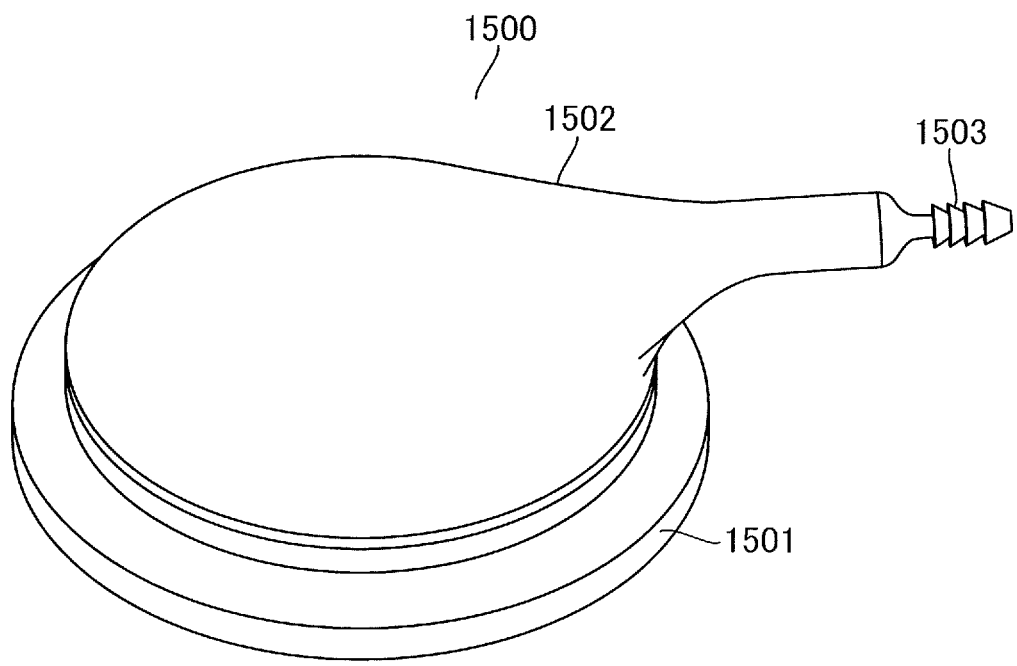
FIG. 15A is a perspective view of a product produced in a fifth exemplary embodiment.
Figure 15B:
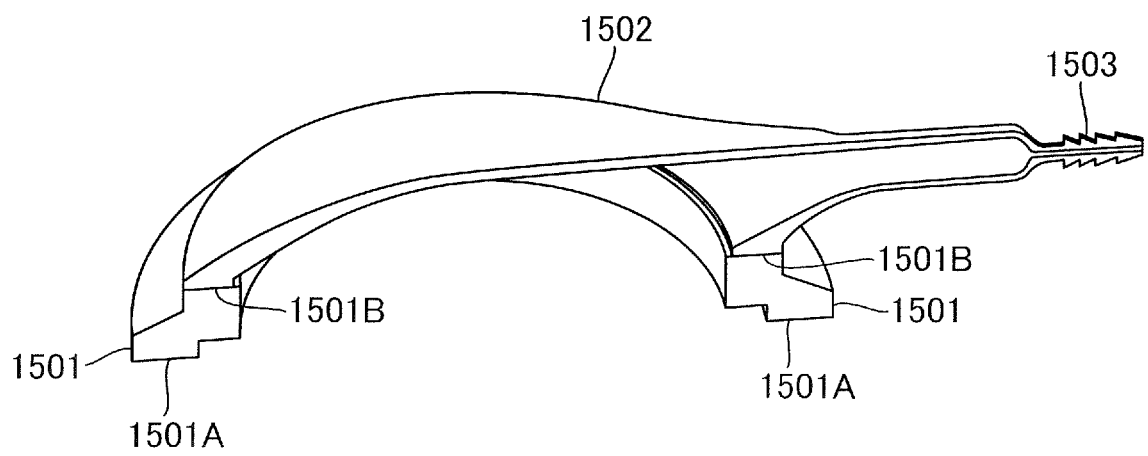
FIG. 15B is a perspective view of a partially cut model of the product of the fifth exemplary embodiment.

FIG. 15A is a perspective view of an example of a product to be produced in the present exemplary embodiment. In addition, FIG. 15B is a perspective view of a partially cut model for understanding the structure of the product.

The product illustrated in FIG. 15 is a suction pad 1500. The suction pad 1500 includes a ring-shaped pad portion 1501 including a suction surface 1501A that is to be produced as a smooth surface with a high precision for ensuring airtightness. In addition, the suction pad 1500 also includes a body portion 1502 and a pipe connecting portion 1503 as portions for which no precision of shape as high as the precision of shape of the suction surface 1501A is required.
Method of Production A method of production according to the present exemplary embodiment will be described with reference to the flowchart of FIG. 3 and also to FIGS. 15 and 16.

First, in step S1 of FIG. 3, a portion to be prepared as a member in advance and a portion to be formed on the prepared member by selective laser sintering are distinguished in the overall shape of the suction pad 1500 serving as a product, and the shape of each portion is designed.

The portion to be prepared as a member in advance is a portion for which a high precision of shape that is difficult to achieve in selective laser sintering. In the example of the suction pad 1500, the pad portion 1501 corresponds to the portion.

The portion to be formed on the member by selective laser sintering is a portion that is not practically problematic for the function and production yield of the product even in the case where a tolerance of the portion is set in accordance with the precision of shape that can be achieved by selective laser sintering. In the example of the suction pad 1500, the body portion 1502 and the pipe connecting portion 1503 correspond to the portion.

In designing the shape of each portion, the shape of a boundary surface between a member portion and a sintered powder portion is determined in consideration of requirement in production steps of forming the sintered powder portion similarly to the first to fourth exemplary embodiments.

That is, the boundary surface between the member portion and the sintered powder portion is desirably set to be substantially flat. In the present exemplary embodiment, the boundary between the ring-shaped pad portion 1501 serving as a member portion and the body portion 1502 serving as a sintered powder portion is set as a boundary surface 1501B illustrated in FIG. 15B.

After the shapes of the member portion and the sintered powder portion are determined, a member is prepared in accordance with the designed shape of the member portion in step S2 of FIG. 3. In the present exemplary embodiment, a ring-shaped member 1600 having a bottom surface that is a smooth surface having a remarkably high flatness is prepared. The upper surface of the member 1600 is formed as a surface having a high flatness such that the raw material powder for sintering can be deposited to a constant thickness. The upper surface may be subjected to surface roughening treatment such that the upper surface has microscopically large surface roughness to improve adhesion strength between the member and the sintered powder portion.

Figure 16:
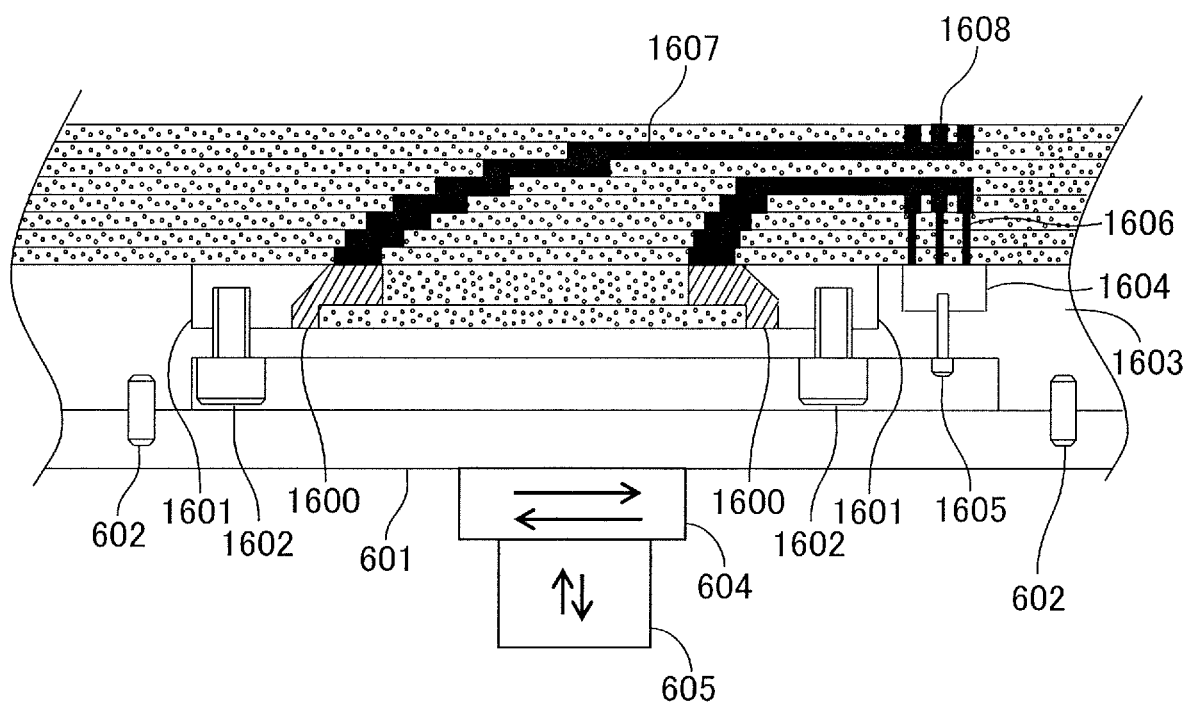
FIG. 16 schematically illustrates three-dimensional shaping according to the fifth exemplary embodiment in section view.

Next, a plate for supporting the member at a predetermined position and posture when forming the sintered powder portion is prepared in step S3 of FIG. 3. In the present exemplary embodiment, a plate 1603 whose sectional shape is schematically illustrated in FIG. 16 is prepared.

In contrast to the member exemplified in the first to fourth exemplary embodiments, the member 1600 of the present exemplary embodiment includes a portion requiring airtightness such as a suction surface, and thus it is difficult to provide a screw hole in the member 1600. Therefore, in the present exemplary embodiment, holding members 1601 are used for positioning and fixing the member 1600. That is, the holding members 1601 are caused to abut the member 1600 from the outside of the member 1600, and the holding members 1601 are positioned and fixed on the plate 1603 by using bolts 1602. Although two holding members 1601 are used in the example of FIG. 16, three or more holding members may be provided.

The body portion 1502 and the pipe connecting portion 1503 that are to be formed by sintering in the present exemplary embodiment have shapes overhanging from the member 1600 in the lateral direction, and thus a support structure 1606 needs to be formed thereunder by sintering. In other words, a sintering starting surface needs to be present also in another region different from the upper surface of the member 1600. In the case where the upper surface of the plate 1603 is set as a sintering starting surface, a support structure formed by sintering adheres to the plate 1603 that has been used once, and it becomes difficult to use the plate 1603 again. Therefore, the plate 1603 of the present exemplary embodiment is configured such that a sintering stage 1604 can be attached thereto and detached therefrom. The sintering stage 1604 is not a member included in the suction pad 1500 serving as a product, and is a stage whose upper surface serves as a sintering starting surface for forming a sintered portion.

In the present exemplary embodiment, the sintering stage 1604 is configured as a screwable piece member that can be attached to and detached from the plate 1603 by using bolts 1605 such that the sintering stage 1604 can be replaced. Thus, reuse of the plate 1603 is facilitated.

To facilitate depositing the raw material powder on the upper surface of the member 1600 at a constant thickness, in the present exemplary embodiment, upper surfaces of the member 1600, the holding member 1601, the sintering stage 1604, and the plate 1603 are set to be in the same plane.

The plate 1603 on which the member 1600 and the sintering stage 1604 are set is positioned by using the pins 602, and is mounted on the shaping table 601 of the additive manufacturing apparatus. Then, a body portion 1607, a pipe connecting portion 1608, and the support structure 1606 are formed by repetitively performing deposition of the raw material powder and laser sintering similarly to the first to fourth exemplary embodiments. The shaped product is separated from the plate 1603, the support structure 1606 is cut off by machining, and thus the suction pad 1500 serving as a product is completed.

According to the present exemplary embodiment, even a member in which a bolt hole or the like cannot be provided can be positioned and fixed on a plate by holding the member with a holding member. Since a sintering stage is configured to be attachable to and detachable from the plate, the plate is not damaged even in the case where sintering is started from a region different from the upper surface of the member for, for example, forming a support structure. Therefore, it becomes easier to reuse the plate, and the cost for mass-production of the product can be reduced.

Other Exemplary Embodiments

Applications of the present invention are not limited to the exemplary embodiments described above, and the exemplary embodiments can be modified and combined as appropriate.

For example, in the flowchart of method of production described with reference to FIG. 3, the order of steps S2 and S3 may be exchanged, or these steps may be performed in parallel. In addition, step S8 may be omitted if not necessary depending on the product to be produced. In addition, a step of cleaning, by using air blower or the like, powder that is not sintered and attached to the product may be added after step S7 or step S9. In addition, the mechanism for positioning and fixing the member on the plate does not have to be screwing.

In addition, the shape of the plate does not have to be a plate shape as shown in the exemplary embodiments, and may be any shape as long as a member can be fixed thereon in a predetermined position and posture and the plate can function as a base stage for mounting the member on the additive manufacturing apparatus in an attachable and detachable manner.

In the exemplary embodiments described above, description has been given by taking a three-dimensional shaping method and an additive manufacturing apparatus in which powder of a sintering material is layered on a member and the powder is sintered by selectively radiating laser light. However, the method of directly forming a three-dimensionally shaped object on a member positioned and fixed on a plate is not limited to this. For example, steps of placing a shaping material formed in a sheet shape in advance on a member, heating the shaping material by selectively irradiating the shaping material with laser light, and transferring the shaping material onto a member positioned and fixed on a plate to layer the shaping material on the member may be repetitively performed. In addition, a method of applying a photocurable liquid material on the upper surface of a member positioned and fixed on a plate by, for example, immersing the member in a liquid of photocurable resin, causing photocuring by selectively radiating ultraviolet laser light, and thus forming a photo-cured portion on the member may be employed.

In addition, although the first to fifth exemplary embodiments show examples in which the same kinds of materials are preferably used for materials of a member and a three-dimensionally shaped portion, a combination of materials whose physical properties are greatly different may be employed depending on the product to be produced as long as adhesion is possible. For example, in the case where the product to be produced is an electric component that includes a contact portion and an insulation portion and has a complex shape, the insulation portion may be three-dimensionally shaped from an insulating material such as resin on a conductive member formed by machining from metal or the like.

In addition, although two members are prepared and connected to a shaped portion formed by three-dimensional shaping in the first exemplary embodiment, the number of members may be three or more. In addition, the case of using a sintering stage described in the fifth exemplary embodiment is not limited to a case where the number of member is one, and a support structure may be also formed by using a sintering stage in the case where plural members are used.

According to the aspects of the present invention, a product including a portion requiring a high precision of shape can be produced at low cost while using selective laser sintering.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-244809, filed Dec. 16, 2016 and Japanese Patent Application No. 2017-219082, filed Nov. 14, 2017, which are hereby incorporated by reference herein in their entirety.

What is claimed is:

1. A method of producing a product, the method comprising:
   a preparation step of preparing a member that constitutes a part of the product;
   a fixing step of positioning and fixing the member on a plate, using a fixing mechanism that is configured to change a fixing force;
   a mounting step of positioning and mounting the plate on which the member has been fixed on an additive manufacturing apparatus;
   a shaping step of forming, by the additive manufacturing apparatus placing a shaping material on an upper surface of the member and irradiating the shaping material with laser light, a shaped portion adhering to the upper surface of the member;
   a dismounting step of dismounting the plate on which the member bearing the shaped portion formed thereon is fixed from the additive manufacturing apparatus; and
   a separation step of, after the dismounting step, loosening the fixing force of the fixing mechanism, separating the member bearing the shaped portion formed thereon from the plate.

2. The method according to claim 1, further comprising, before the preparation step, a generation step of generating a first shape data of the product and a second shape data of the product, the first shape data being shape data of a portion to be prepared in advance, the second shape data being shape data of a portion to be formed by the additive manufacturing apparatus.

3. The method according to claim 2, wherein the shaping step is a step of a controller of the additive manufacturing apparatus controlling radiation of the laser light on a basis of the second shape data.

4. The method according to claim 2, wherein the preparation step comprises a step of forming the member by a production apparatus having a higher precision of shape than the additive manufacturing apparatus on a basis of the first shape data.

5. The method according to claim 1, the fixing step is a step of fixing the member to a position at which an offset corresponding to contraction occurring after forming the shaped portion is corrected.

6. The method according to claim 1, further comprising, after the dismounting step and before the separation step, a step of annealing the plate on which the member bearing the shaped portion formed thereon is fixed.

7. The method according to claim 1, further comprising, after the fixing step and before the mounting step, a step of performing a surface treatment on the upper surface of the member fixed on the plate.

8. The method according to claim 7, wherein the surface treatment is a surface roughening treatment.

9. The method according to claim 7, wherein the surface treatment is a cleaning treatment.

10. The method according to claim 1, wherein, in the fixing step, plural members that constitute the product are positioned and fixed on the plate.

11. The method according to claim 10, wherein the plural members that constitute the product are positioned and fixed on the plate such that upper surfaces of the plural members are parallel to one another.

12. The method according to claim 10, wherein the plural members that constitute the product are positioned and fixed on the plate such that upper surfaces of the plural members are positioned in the same plane.

13. The method according to claim 10, wherein, in the shaping step, the plural members that constitute the product are interconnected by the shaped portion.

14. The method according to claim 1, wherein the shaping step is a step of layering a powder of a sintering material on the upper surface of the member and irradiating the powder with laser light to sinter the powder.

15. The method according to claim 1, wherein the shaping step is a step of applying a photocurable liquid material on the upper surface of the member and irradiating the photocurable liquid material with laser light to cure the photocurable liquid material.

16. The method according to claim 1, wherein the fixing mechanism is configured to use either a mechanical force, a magnetic force, or attraction as the fixing force.

17. The method product according to claim 16, wherein the fixing mechanism comprises screws that exert the fixing force.

18. The method according to claim 17, wherein the member comprises screw holes that are configured to fit the screws.

19. The method according to claim 17, wherein the fixing mechanism further comprises holding members configured to fix the member on the plate, the holding members comprising screw holes that are configured to fit the screws.

20. The method according to claim 7, wherein the step of performing the surface treatment is a step of cutting the upper surface of the member to adjust height.

21. A method of producing a structure, the method comprising:
   a step of producing a product by the method according to claim 1;
   a step of preparing a part; and
   a step of coupling the product with the part.

* * * * *